(12) United States Patent
Fourney

(10) Patent No.: US 7,533,766 B1
(45) Date of Patent: May 19, 2009

(54) APPARATUS AND METHOD FOR ACTIVATING CONVEYOR BELT ROLLERS

(75) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 12/018,240

(22) Filed: Jan. 23, 2008

(51) Int. Cl.
*B65G 47/46* (2006.01)

(52) U.S. Cl. .................................. 198/370.09; 198/779

(58) Field of Classification Search ............ 198/370.09, 198/779, 850, 853
See application file for complete search history.

(56) References Cited

U.S. PATENT DOCUMENTS

| | | | |
|---|---|---|---|
| 3,439,790 A | 4/1969 | Langley et al. | |
| 3,934,707 A | 1/1976 | Bowman | |
| 5,085,311 A | 2/1992 | Garro | |
| 5,238,099 A * | 8/1993 | Schroeder et al. ........... | 198/779 |
| 5,810,158 A | 9/1998 | Schiesser et al. | |
| 6,318,544 B1 * | 11/2001 | O'Connor et al. ........... | 198/853 |
| 6,523,672 B2 | 2/2003 | Greve | |
| 6,571,937 B1 * | 6/2003 | Costanzo et al. ....... | 198/370.09 |
| 7,237,670 B1 * | 7/2007 | Ryan ..................... | 198/370.09 |
| 7,344,018 B2 * | 3/2008 | Costanzo et al. ............ | 198/779 |
| 2006/0249355 A1 | 11/2006 | Costanzo et al. | |

* cited by examiner

*Primary Examiner*—James R Bidwell
(74) *Attorney, Agent, or Firm*—James T. Cronvich

(57) ABSTRACT

Apparatus and method for activating conveyor belt rollers by raising and lowering the conveyor belt. Article-supporting rollers extending through the thickness of the conveyor belt are deactivated when the belt is raised to a position in which the belt rollers do not contact bearing surfaces below the belt. Belt rollers are activated to rotate when the belt is lowered to a position in which the belt rollers ride on the bearing surfaces below the belt and rotate to push articles conveyed atop the belt rollers in the direction of rotation as the belt advances. Linear support surfaces, such as wearstrips, between the bearing surfaces are raised and lowered into and out of supporting contact with the bottom of the belt by selectively inflatable bladders.

11 Claims, 4 Drawing Sheets

APPARATUS AND METHOD FOR ACTIVATING CONVEYOR BELT ROLLERS

BACKGROUND

The invention relates generally to power-driven conveyors and, more particularly, to conveyors having conveyor belts with article-supporting rollers extending through the thickness of the belt and selectively activated and deactivated by lowering the conveyor belt onto and raising the conveyor belt above roller bearing surfaces.

Modular plastic conveyor belts with article-supporting rollers extending through the belt are used in many package-handling conveyors, such as sorters, singulators, and diverters. The belt rollers are activated by bearing surfaces, such as flat wearstrips or roller arrays, underlying the belt on the carryway. As the belt advances along the carryway, the belt rollers rotate as they roll on the bearing surfaces. Articles atop the rollers are pushed along the advancing belt in a direction perpendicular to the rollers' axes of rotation, which may be parallel, perpendicular, or oblique to the direction of belt travel.

In some applications, it is desirable to selectively activate and deactivate the belt rollers. This is conventionally done by moving, such as raising and lowering, the bearing surfaces into and out of contact with the belt rollers. But the bearing surfaces that have to be moved can be heavy or unwieldy and require a heavy motor or complex framework to make them move.

SUMMARY

These shortcomings are overcome by a conveyor embodying features of the invention. In one version, the conveyor comprises a conveyor belt advancing longitudinally in a direction of belt travel. The conveyor belt has article-supporting rollers arranged in longitudinal columns and lateral rows. The rollers extend through the thickness of the belt. Linear support surfaces below the belt extend in the direction of belt travel. The support surfaces are laterally offset from the columns of rollers. Bearing surfaces for the rollers are disposed at a fixed level below the conveyor belt between the support surfaces. The conveyor further provides means for raising and lowering the support surfaces into and out of contact with the belt to raise and lower the belt between a raised position supported on the support surfaces in which the article-supporting rollers are out of contact with the bearing surfaces and a lowered position in which the rollers are supported in rolling contact on the bearing surfaces.

Another version of the conveyor comprises a conveyor belt advancing longitudinally in a direction of belt travel. The conveyor belt has an outer side and an inner side. Rollers arranged in longitudinal columns and lateral rows extend past the inner and outer sides of the belt. Linear support surfaces laterally offset from the columns of rollers extend longitudinally at the inner side of the belt. Bearing surfaces are disposed below the inner surface of the belt between the support surfaces. Bladders supporting the support surfaces are selectively inflated and deflated to raise and lower the support surfaces between first and second positions. In the first position, the support surfaces contact and support the conveyor belt in a raised position out of contact with the bearing surfaces. In the second position, the support surfaces are out of contact with the belt, allowing the belt to assume a lowered position with the rollers in rolling contact with the bearing surfaces at the inner side of the advancing conveyor belt.

In another aspect of the invention, a method for operating and advancing a conveyor belt comprises: (a) deactivating article-supporting rollers in the belt by pushing the conveyor belt between columns of the rollers up to a raised position in which the rollers are free of contact below the belt; and (b) activating the article-supporting rollers by lowering the conveyor belt to a lowered position in which the rollers are supported in rolling contact on bearing surfaces below the advancing conveyor belt.

BRIEF DESCRIPTION OF THE DRAWINGS

These aspects and features of the invention, as well as its advantages, are better understood by referring to the following description, appended claims, and accompanying drawings, in which:

DETAILED DESCRIPTION

Figure 1:
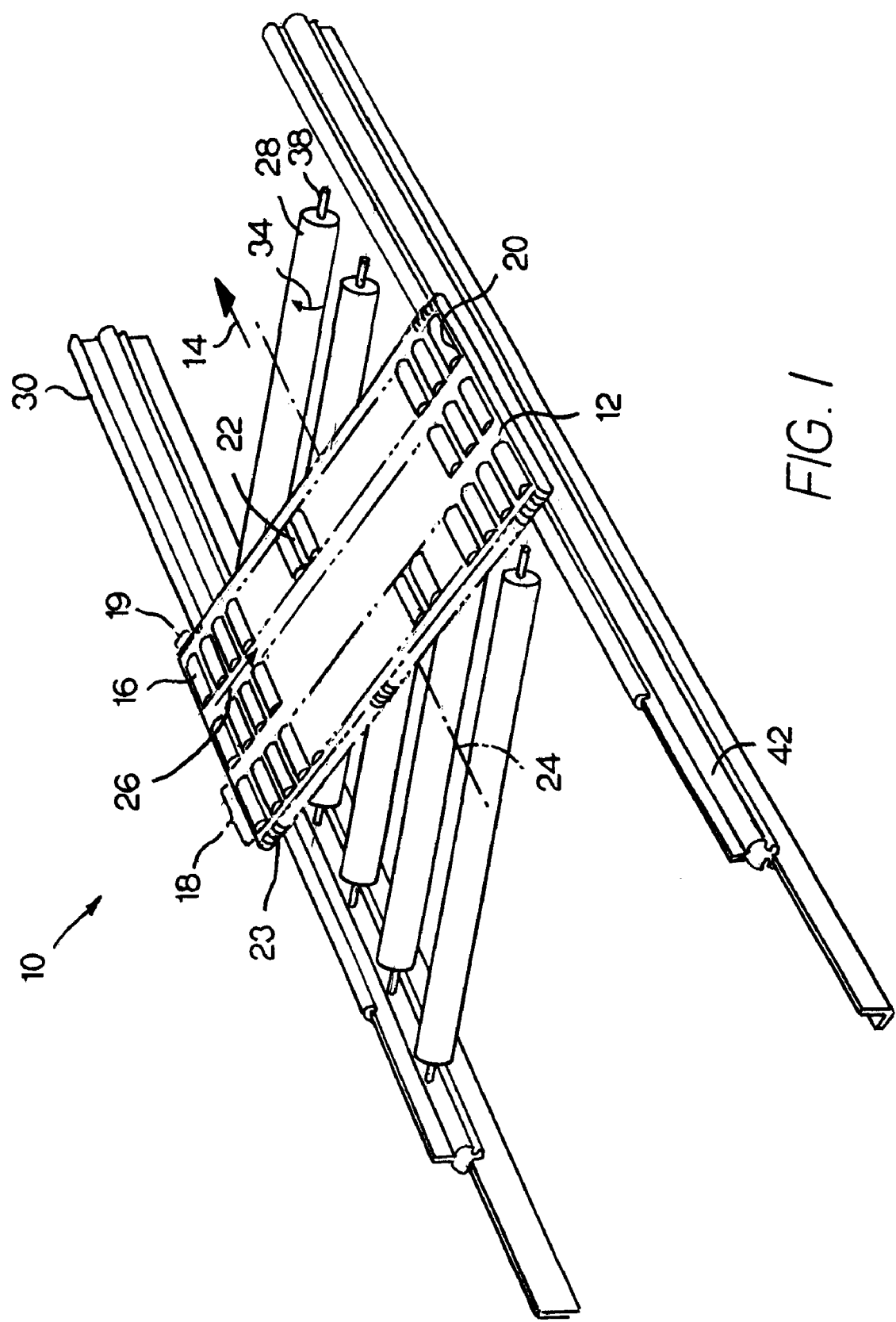
FIG. 1 is a perspective view of a portion of a conveyor embodying features of the invention.
Figure 2:
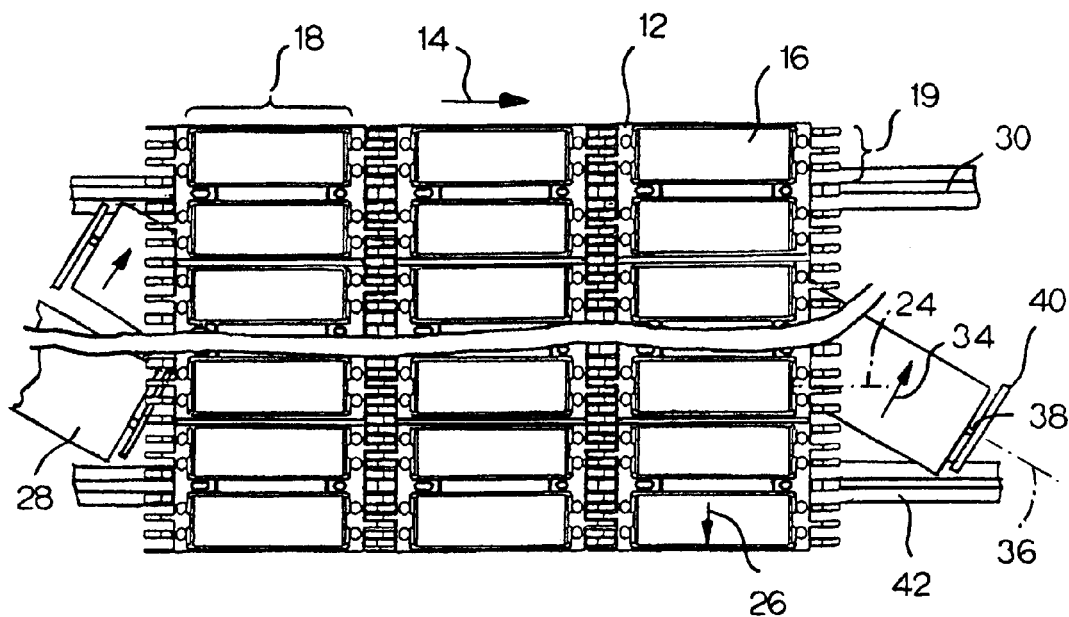
FIG. 2 is a top plan view of a portion of the conveyor of FIG. 1.

A portion of a conveyor embodying features of the invention is shown in FIGS. 1 and 2. The conveyor 10 transports articles atop a conveyor belt 12 along an upper carryway run in a direction of belt travel 14. The belt shown contains article-supporting rollers 16 arranged in lateral rows 18 and longitudinal columns 19. The rollers reside in cavities 20 that open onto outer and inner surfaces 22, 23 of the belt, that is, top and bottom surfaces of the belt on the carryway. Conveyed articles are supported atop salient portions of the rollers protruding upward past the outer surface. Salient portions of the rollers protrude past the inner surface of the belt as well. The rollers are retained in the cavities on axles aligned along longitudinal axes 24 parallel to the direction of belt travel. Consequently, when the rollers rotate, they rotate in the direction 26, pushing articles toward a side of the conveyor belt.

Figure 4A:
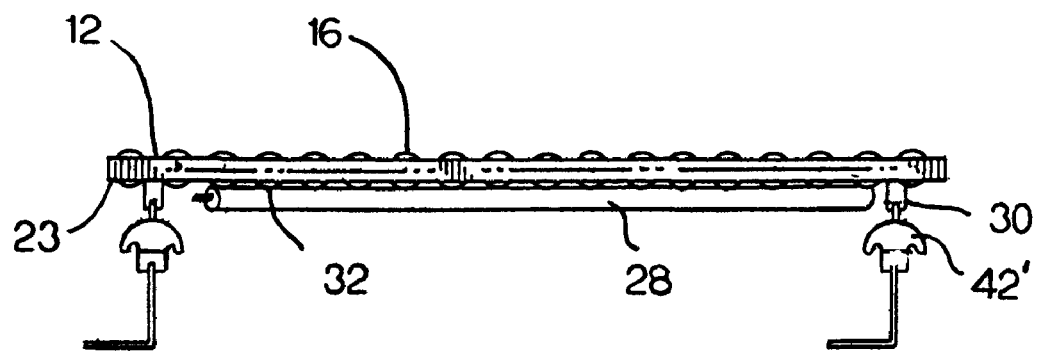
FIGS. 4A and 4B are elevation views of the conveyor of FIG. 1 showing the conveyor belt in roller-activated and roller-deactivated positions.

The upper article-conveying or carryway run of the conveyor belt 12 is supported either on bearing surfaces, such as the peripheries of actuating rollers 28, or on linear support surfaces 30, such as wearstrips. When the belt is supported on the actuating rollers 28, as shown in FIG. 4A, the salient portions 32 of the article-supporting rollers 16 extending past the bottom surface 23 of the belt contact the peripheries of the actuating rollers. The forward motion of the belt in the direction of belt travel 14 causes the article-supporting rollers and the actuating rollers to rotate in the directions given by arrows 26 and 34 in FIG. 2. The actuating rollers 28 are arranged to rotate on axes 36 oblique to the direction of belt travel and to the axes 24 of the belt rollers. The actuating rollers rotate on axles 38 whose ends are supported in brackets 40 attached to the conveyor frame (not shown). Thus, the article-supporting belt rollers 16 are activated by rolling contact with the peripheral bearing surfaces of the underlying actuating rollers 28.

Figure 4B:
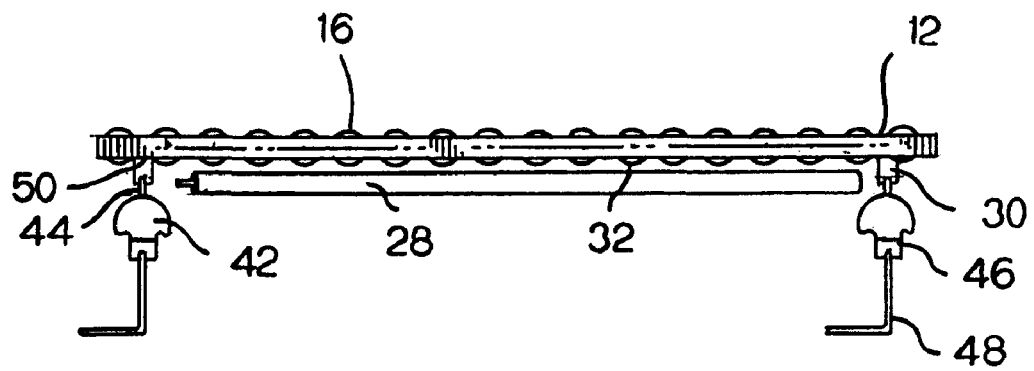

As best illustrated in FIG. 4B, the belt rollers are deactivated by raising the belt 12 to a raised position in which the salient portions of the belt rollers below the belt are out of contact with the actuating rollers 28. The belt is raised by means of a hollow inflatable bladder 42 atop which the linear support surface 30 rests. A rib 44 running along the length of each bladder serves as a mounting rib for the support surface. A slot in the bottom of the support surface receives the top of the rib, which is compressed between the sides of the support surfaces flanking the slot or is otherwise fastened to the support surfaces. The bladder resides in a base 46 that is supported on a bracket 48 in the conveyor frame. The actuating roller array is disposed between the linear support surfaces at a fixed level, or elevation, above the floor.

As shown in a comparison of FIGS. 4A and 4B, the belt may be moved between a lowered, activated position, as in FIG. 4A, and a raised, deactivated position, as in FIG. 4B. In the lowered position, the bladder 42' is deflated to lower the belt so that its rollers ride on the oblique actuating rollers and direct articles atop the belt rollers toward one side of the belt. When the bladder is inflated, as in FIG. 4B, it pushes the support surface 30 upward. The longitudinal support surface is linear and narrow enough to fit in a longitudinal gap 50 between adjacent columns of belt rollers at the inner side of the belt. In the raised, deactivated position, the belt rollers are out of contact with the actuating rollers and are not rotated by virtue of the forward motion of the belt. In this raised position of the belt, conveyed articles are not pushed toward the side of the belt.

Figure 3:
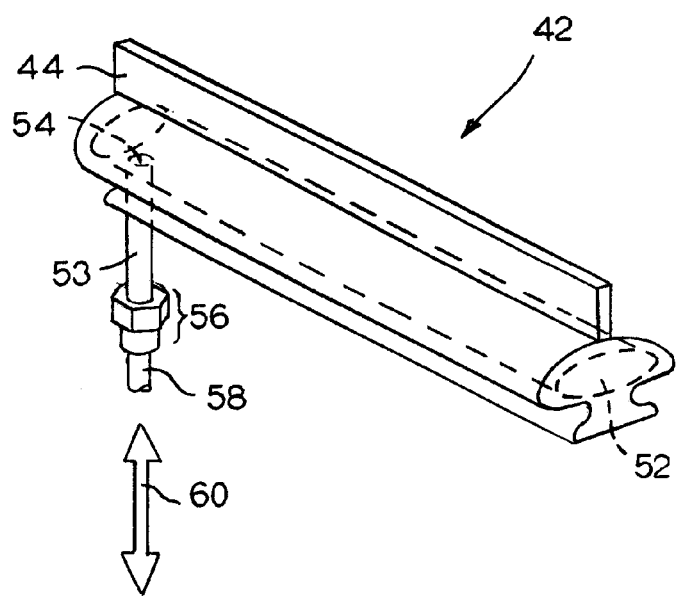
FIG. 3 is an isometric view of an inflatable bladder used in a conveyor as in FIG. 1.

An exemplary bladder is shown in FIG. 3. The bladder is a flexible rubber or elastomeric body with a hollow core 52. An air tube 53 admits air into and out of the bladder through an opening 54 into the hollow core. A coupling 56 connects the air tube of the bladder to an air line 58 from an air valve that is selectively operated to inject air into or to release it from the hollow core to inflate or deflate the bladder, as indicated by two-headed arrows 60. Thus, the inflatable bladders serve as one means for raising and lowering the support surfaces into and out of supporting contact with the conveyor belt.

Figure 5:
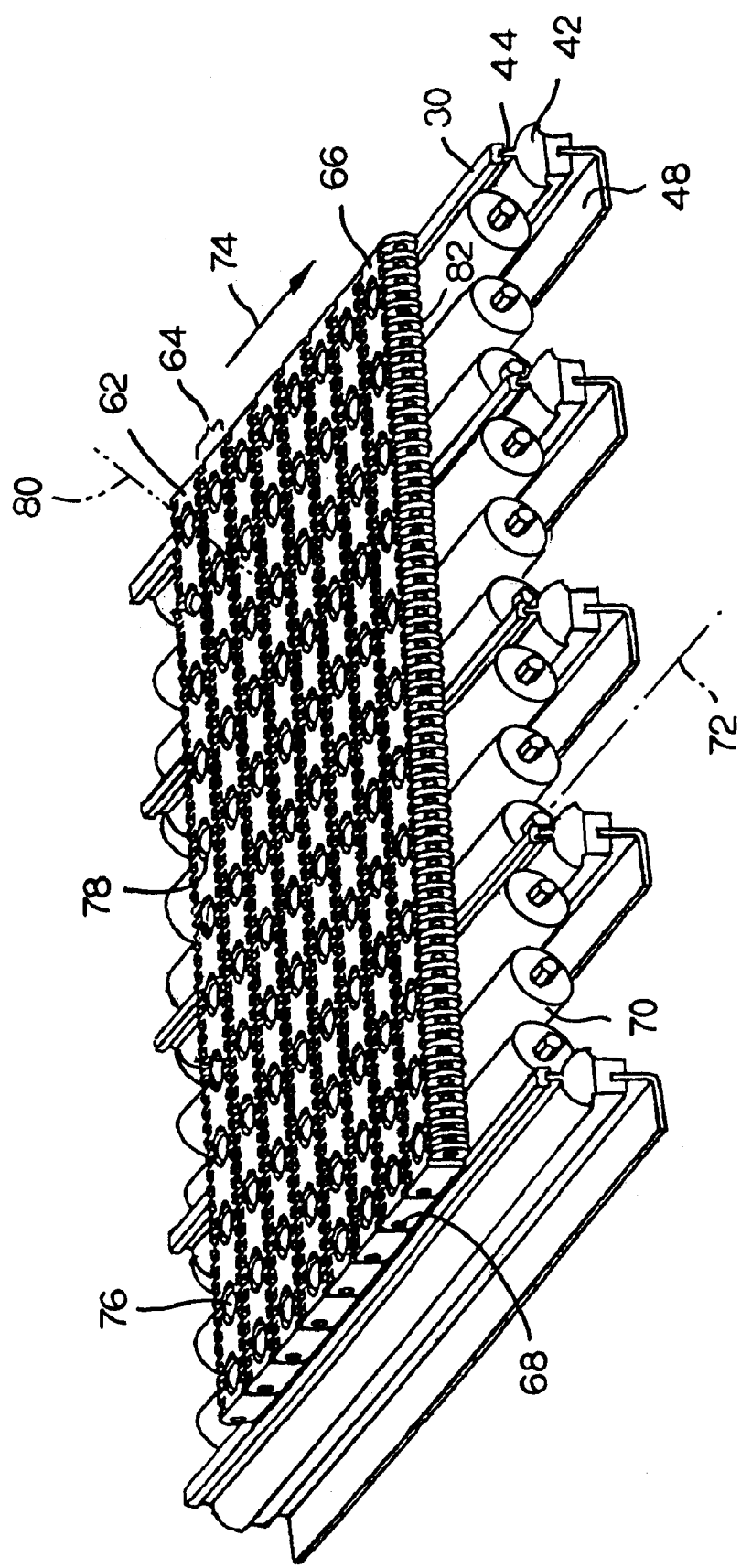
FIG. 5 is an isometric view of another version of a conveyor embodying features of the invention.

Another version of a belt conveyor that can be selectively operated to direct conveyed articles toward or off the side of the belt or not is shown in FIG. 5. The exemplary belt shown is a Series 400 Angled Roller™ belt manufactured and sold by Intralox, L.L.C. of Harahan, La., U.S.A. The belt 62 is a modular plastic conveyor belt constructed of rows 64 of one or more belt modules 66 interconnected at hinge joints 68 in a bricklay pattern. Just as for the conveyor of FIG. 1, the means for raising and lowering the conveyor belt of FIG. 5 includes a support surface in the form of a wearstrip 30 mounted to the rib 44 molded to the inflatable bladder 42 retained in a base 46 supported on a bracket 48. The actuating rollers 70 in this version rotate on axes 72 parallel to the direction of belt travel 74. The belt rollers 76 are mounted in cavities 78 on axles defining axes of rotation 80 oblique to the direction of belt travel. When the bladders are deflated, the belt is lowered to a level with the belt rollers supported on the peripheries of the longitudinal lanes of actuating rollers. The forward motion of the belt causes both sets of rollers to rotate. The oblique belt rollers follow a helical path along the peripheries of the actuating rollers with little slip. The belt rollers rotate in the direction of arrow 82 to push articles toward one side of the belt. When the bladders are inflated, the support surfaces 30 push the belt upwards in gaps between columns of belt rollers to a raised position in which the belt rollers are out of contact with the actuating rollers. In this raised position, the belt rollers do not rotate by the action of the forward motion of the belt, and conveyed articles are not pushed toward the side of the belt.

Although the invention has been described with reference to a few preferred versions, other versions are possible. For example, the roller-actuating bearing surfaces used with oblique belt rollers as in FIG. 5 could be flat surfaces rather than rollers for use with slightly oblique belt rollers or belt rollers arranged to rotate on axes perpendicular to the direction of belt travel. As another example, the belt rollers could be omnidirectional roller balls rolling on flat bearing surfaces rather than rollers rotating on thick axles. As yet another example, the shape of the inflatable bladder and its connection to the linear support surface could be different from what is described in detail. So, as these few examples suggest, the scope of the claims is not meant to be limited to the preferred versions described by way of example.

What is claimed is:

1. A conveyor comprising:
   a conveyor belt advancing longitudinally in a direction of belt travel and having a plurality of article-supporting rollers arranged in longitudinal columns and lateral rows and extending through the thickness of the belt;
   linear support surfaces laterally offset from the columns of article-supporting rollers and extending in the direction of belt travel below the conveyor belt;
   bearing surfaces disposed at a fixed level below the conveyor belt and between the support surfaces;
   means for raising and lowering the support surfaces into and out of supporting contact with the conveyor belt to raise and lower the conveyor belt between a raised position supported on the support surfaces in which the article-supporting rollers are out of contact with the bearing surfaces and a lowered position in which the article-supporting rollers are supported in rolling contact on the bearing surfaces.

2. A conveyor as in claim 1 wherein the means for raising and lowering the support surfaces comprises inflatable bladders under the support surfaces.

3. A conveyor as in claim 1 wherein the article-supporting rollers rotate on longitudinal axes and the bearing surfaces are formed on the peripheries of actuating rollers having axes oblique to the direction of belt travel.

4. A conveyor as in claim 1 wherein the article-supporting rollers rotate on axes oblique to the direction of belt travel.

5. A conveyor as in claim 1 wherein the bearing surfaces are formed on the peripheries of actuating rollers below the conveyor belt.

6. A conveyor comprising:
   a conveyor belt advancing longitudinally in a direction of belt travel and having an outer side and an inner side and a plurality of rollers arranged in longitudinal columns and lateral rows and extending past the inner and outer sides;
   linear support surfaces laterally offset from the columns of rollers and extending longitudinally at the inner side of the conveyor belt;
   bearing surfaces disposed below the inner surface of the conveyor belt between the support surfaces;
   bladders supporting the support surfaces and selectively inflated and deflated to raise and lower the support surfaces between a first position contacting and supporting the conveyor belt in a raised position out of contact with the bearing surfaces and a second position out of supporting contact with the conveyor belt to allow the conveyor belt to assume a lowered position with the rollers in rolling contact with the bearing surfaces at the inner side of the advancing conveyor belt.

7. A conveyor as in claim 6 wherein the article-supporting rollers rotate on longitudinal axes and the bearing surfaces are formed on the peripheries of actuating rollers having axes oblique to the direction of belt travel.

8. A conveyor as in claim 6 wherein the article-supporting rollers rotate on axes oblique to the direction of belt travel.

9. A conveyor as in claim 6 wherein the bearing surfaces are formed on the peripheries of actuating rollers below the conveyor belt.

10. A method for operating an advancing conveyor belt having rows and columns of article-supporting rollers extending through the thickness of the belt, the method comprising:

deactivating the article-supporting rollers by pushing the conveyor belt between the columns of article-supporting rollers up to a raised position in which the article-supporting rollers are free of contact below the conveyor belt;

activating the article-supporting rollers by lowering the conveyor belt to a lowered position in which the article-supporting rollers are supported in rolling contact on bearing surfaces below the advancing conveyor belt.

11. The method of claim 10 comprising inflating and deflating a bladder to raise and lower the conveyor belt between the raised and lowered positions.

* * * * *